United States Patent
Haider et al.

(10) Patent No.: US 9,994,666 B2
(45) Date of Patent: Jun. 12, 2018

(54) POLYURETHANE/POLYUREAS

(71) Applicant: Bayer MaterialScience LLC, Pittsburgh, PA (US)

(72) Inventors: Karl W. Haider, Wexford, PA (US); Wendy Gustavich, Maynard, OH (US); Richard R. Roesler, Relican Rapids, MN (US); Rick V. Starcher, Monaca, PA (US)

(73) Assignee: COVESTRO LLC, Pittsburgh, PA (US)

( * ) Notice: Subject to any disclaimer, the term of this patent is extended or adjusted under 35 U.S.C. 154(b) by 0 days. days.

(21) Appl. No.: 14/108,911

(22) Filed: Dec. 17, 2013

(65) Prior Publication Data

US 2015/0166712 A1    Jun. 18, 2015

(51) Int. Cl.
| | |
|---|---|
| *C08G 18/10* | (2006.01) |
| *C08G 18/69* | (2006.01) |
| *C08G 18/32* | (2006.01) |
| *C08G 18/42* | (2006.01) |

(52) U.S. Cl.
CPC ........... *C08G 18/10* (2013.01); *C08G 18/324* (2013.01); *C08G 18/4211* (2013.01); *C08G 18/69* (2013.01)

(58) Field of Classification Search
CPC .... C08G 18/10; C08G 18/12; C08G 18/4277; C08G 18/4854
USPC ............................................ 528/44; 525/453
See application file for complete search history.

(56) References Cited

U.S. PATENT DOCUMENTS

| | | |
|---|---|---|
| 3,755,262 A | 8/1973 | Slagel |
| 3,866,242 A | 2/1975 | Slagel |
| 4,153,777 A | 5/1979 | Slagel |
| 4,404,353 A | 9/1983 | Slagel |
| 4,808,690 A | 2/1989 | Slagel |
| 5,510,445 A | 4/1996 | Haider et al. |
| 5,646,230 A | 7/1997 | Pantone et al. |
| 5,714,562 A | 2/1998 | Rosthauser et al. |
| 5,811,506 A | 9/1998 | Slagel |
| 5,962,617 A | 10/1999 | Slagel |
| 6,127,505 A | 10/2000 | Slagel |
| 6,174,984 B1 | 1/2001 | Peter |
| 6,258,917 B1 | 7/2001 | Slagel |
| 6,562,932 B1 | 5/2003 | Markusch et al. |
| 6,939,939 B2 | 9/2005 | Slagel et al. |
| 2003/0203771 A1* | 10/2003 | Rosenberg et al. ........... 473/371 |
| 2007/0100112 A1 | 5/2007 | Sarpeshkar et al. |
| 2009/0283932 A1* | 11/2009 | Petrichko ........... A63B 37/0023 264/250 |
| 2012/0172567 A1* | 7/2012 | Imada et al. .................... 528/73 |
| 2012/0238708 A1* | 9/2012 | Hobbs .................... C08G 18/52 525/473 |
| 2013/0043128 A1 | 2/2013 | Boddie |

FOREIGN PATENT DOCUMENTS

| | | |
|---|---|---|
| DE | 2109901 | 10/1971 |
| WO | WO 2011034033 A1 * | 3/2011 |

OTHER PUBLICATIONS

Dow Polyurethanes, Dec. 2014.*
Mark Mattison-Shupnick, Abom; "Trivex Material—Unique Attributes Make It More Than a Niche Material"; 20/20 Magazine; Release Date: Aug. 2010.
Gary Heiting, OD; "Polycarbonate vs. Trivex Eyeglass Lenses—Which Is Right for You?"; AllAboutVision.com; Oct. 2011.
Cooper et al, Properties of Polymers : Correlations with Chemical Structures, D.W. van Krevelen, Elsevier, Amsterdam, 1972, Polymer, Elsevier Science Publishers B.V., vol. 14, No. 1, 1973, p. 40.

* cited by examiner

*Primary Examiner* — Christopher M Rodd
(74) *Attorney, Agent, or Firm* — N. Denise Brown

(57) ABSTRACT

This invention relates to polyurethane/polyureas. These polyurethane/polyurea materials comprise the reaction product of (A) a polyisocyanate prepolymer having an NCO group content of about 4 to about 30% and an average functionality of 1.8 to 6, and (B) an isocyanate-reactive component comprising at least one aromatic diamine compound. The (A) polyisocyanate prepolymers herein comprise the reaction product of (1) at least one (cyclo)aliphatic polyisocyanate with (2) an organic compound having 1.8 to 5 hydroxyl groups and a hydroxyl equivalent weight of 150 to 2000 g/eq., and which is selected from the group consisting of OH-functional polybutadienes, OH-functional polyalkylene, OH-functional polyalkylene phthalates, OH-functional polyalkylene isophthalates, OH-functional polyalkylene terephthalates and mixtures thereof.

4 Claims, No Drawings

POLYURETHANE/POLYUREAS

BACKGROUND OF INVENTION

This invention relates to polyurethane/polyurea materials. These polyurethane/polyureas comprise the reaction product of (A) a polyisocyanate prepolymer, and (B) an isocyanate-reactive component comprising (1) at least one aromatic diamine compound, optionally in the presence of (C) one or more catalysts. The (A) polyisocyanate prepolymers herein comprise the reaction product of (1) at least one (cyclo) aliphatic polyisocyanate with (2) an organic compound having 1.8 to 5 hydroxyl groups and an hydroxyl equivalent weight of 150 to 2000, and is selected from the group consisting of OH functional polybutadienes, OH-functional polyalkylene phthalates, OH-functional polyalkylene isophthalates, OH-functional polyalkylene terephthalates and mixtures thereof.

Various light stable cast elastomers and processes for the production of these elastomers are known and described in the art. See, for example, U.S. Pat. Nos. 3,755,262, 3,866, 242, 4,153,777, 4,404,353 and 4,808,690, and German Offenlegungsschrift 2, 109,901.

Transparent high-impact polyurethane products are disclosed by U.S. Pat. No. 3,755,262. These products may be elastomeric or non-elastomeric in nature. Suitable liquid polyurethane reaction mixtures for preparing these optical polyurethanes are made by the one-shot or prepolymer method. Preferred mixtures comprise a non-aromatic polyisocyanate and a reactive hydrogen containing polyol having an average of more than two hydroxyl groups per molecule and molecular weights of up to about 800.

U.S. Pat. No. 3,866,242 discloses protective shields consisting of a polyurethane, shaped in the contour of a clipboard, windshield, face shield, etc. These polyurethanes are described as being transparent and having excellent optical clarity. Suitable polyurethanes are prepared by reacting a polyester glycol or a polyether glycol with methylenebis (cyclo-hexylisocyanate) to form a prepolymer, and reacting this prepolymer with a primary amine group containing compound, preferably one having a methylene bridge between two aromatic rings such as methylenebis(2-chloroaniline).

U.S. Pat. No. 4,153,777 describes polyurethanes having improved physical properties. This reference specifically discloses non-porous polyurethanes which exhibit good optical clarity and resistance to weathering, ultra-violet and thermal exposure. These polyurethanes comprise an isocyanate-terminated prepolymer which is formed by first reacting the isocyanate with water, and then with a polyol to form the prepolymer. This prepolymer is then chain extended or crosslinked to form the cured polyurethane. Suitable isocyanates include (cyclo)aliphatic isocyanates and suitable chain extenders and crosslinkers include compounds such as 1,4-butanediol and trimethylolpropane.

High heat distortion temperature transparent polyurethanes which are highly crosslinked are described by U.S. Pat. No. 4,808,690. These comprise a prepolymer prepared from a polyisocyanate and at least one multifunctional hydroxy containing intermediate, with a polyol curing component. Suitable multifunctional hydroxyl containing intermediates include polyhydric alcohols, polyester polyols and blends thereof. Suitable polyisocyanates include (cyclo) aliphatic polyisocyanates, and the polyol curing component can be a polyester or a polyhydric alcohol.

Other polyurethane, polyurethane/urea or polyurea materials are disclosed in, for example, U.S. Pat. Nos. 5,510,445, 5,646,230, 5,714,562 and 6,174,984. These materials may be polyurethanes as in U.S. Pat. No. 5,714,562; polyurethane/ureas in as U.S. Pat. No. 5,646,230 and U.S. Pat. No. 6,174,984; or polyureas as in U.S. Pat. No. 5,510,445.

U.S. Pat. No. 6,174,984 discloses clear resilient polyurethane/polyurea elastomers. These elastomers comprise the reaction product of A) a prepolymer of at least one diisocyanate and at least one polyether polyol, having a free diisocyanate content of less than 1% of the prepolymer, B) at least one alkylated aromatic diamine in a quantity sufficient to react with about 50 to 105% of the available isocyanate content in the prepolymer, and C) at least one organic acid catalyst in a quantity sufficient to reduce the pot life to no more than two minutes. These elastomers possess high resilience and clarity.

Polyurea elastomers prepared by a one-step process are described in U.S. Pat. No. 5,510,445. The process comprises reacting (a) one or more (cyclo)aliphatic diisocyanates, (b) one or more liquid amine-terminated polymers containing at least two aromatically bound isocyanate-reactive primary or secondary amine groups and/or aliphatically bound isocyanate-reactive secondary amino groups and having a molecular weight of from 400 to 6,000, and (c) one or more aromatic diamine chain extenders having a molecular weight of from 108 to 399, optionally in admixture with one or more crosslinkers. Suitable diisocyanates include dicyclohexyl-methane-4,4'-diisocyanate (rMDI) and prepolymers thereof. DETDA is disclosed as a suitable aromatic diamine chain extender.

U.S. Pat. Nos. 5,811,506 and 6,258,917 describe extrudable thermoplastic urea-extended polyurethanes. The polyurethane/polyureas in U.S. Pat. No. 5,811,506 comprise the reaction product of (a) a polyurethane prepolymer, (b) at least one first diamine curing agent, and (c) at least one second diamine curing agent that is different from the first diamine curing agent. Polyurethane/polyureas of U.S. Pat. No. 6,258,917 comprise the reaction product of (a) a polyurethane prepolymer, and (b) at least one diamine curing agent selected from the group consisting of 2,4-diamino-3, 5-diethyltoluene, 2,6-diamino-3,5-diethyltoluene, 4,4'-methylene-bis(2-6-diisopropylaniline), trimethylene glycol di-para aminobenzoate and mixtures thereof. These polyurethane/polyureas have a Shore A hardness of 72 to 84, a DMA Tg of −80° C. or less and a TMA softening point of 205 to 208° C.

Polyurethane materials are also disclosed in U.S. Pat. Nos. 5,962,617 and 6,127,505. In U.S. Pat. No. 5,962,617, these comprise the reaction product of (a) a polyurethane prepolymer prepared by reacting methylene-bis(cyclohexyl isocyanate) with an OH-containing intermediate having a $MW_w$ of 500 to 1200, in an equivalent ratio of 2.5 to 4.0 NCO:1.0 OH, and (b) an aromatic diamine curing agent which has two aromatic ring groups attached by a methylene group, in which each aromatic ring is substituted by one $NH_2$ group, and 3 of the remaining 4 positions on the aromatic ring are substituted, with the equivalent ratio of $NH_2$:NCO ranging from 0.95:1.0 to 1.02:1.0.

U.S. Pat. No. 6,127,505 discloses that these polyurethane/polyurea materials comprise the reaction product of (a) a polyurethane prepolymer and (b) at least a first aromatic diamine curing agent. Suitable prepolymers are prepared by reacting an aliphatic or cycloaliphatic diisocyanate with an OH containing intermediate having a $MW_w$ of 400 to 2,000, in which the equivalent ratio is about 2.5 to 4.0 NCO/1.0 OH. The diamine curing agent is selected from 2,4-diamino- 3,5-diethyl toluene, 2,6-diamino-3,5-diethyl toluene and mixtures thereof, in an equivalent ratio of NH$_2$:NCO of 0.85:1.0 to 1.02:1.0.

Light stable, optically clear, one-shot urethane-urea elastomers and a process for their production are described in U.S. Pat. No. 6,562,932. This process comprises reacting a polyisocyanate or prepolymer thereof with an isocyanate-reactive component, in the presence of C) at least one organometallic catalyst. Suitable isocyanate-reactive components comprise (1) at least one aromatic diamine compound and (2) at least one organic compound having at least two hydroxyl groups and having a molecular weight of 62 to 6,000.

U.S. Pat. No. 6,939,939 discloses a polyurea/urethane material and a process for making this material. These polyurea/urethane materials are described as having good optical quality and high impact resistance. These comprise the reaction product of A) a urethane prepolymer prepared by reacting a first diisocyanate with a first polyol in amounts such that the prepolymer has an equivalent ratio of at least about 3 isocyanate groups per hydroxyl group; with B) a curing agent comprising (1) a hydroxyl-terminated extended chain polymer prepared by reacting a second diisocyanate with a second polyol in an amount such that the resultant polymer has an equivalent ratio of between about 3 and about 8 hydroxyl groups per isocyanate group; and (2) a diamine, in the presence of a catalyst.

U.S. Published Patent Application 2007/0100112 discloses optically clear polyurethane-ureas which comprise the reaction product of a (cyclo)aliphatic polisocyanate or prepolymer thereof with an isocyanate-reactive component that comprises one or more aromatic diamines that contain two primary amine groups, and one or more compounds containing two secondary amine groups which may be linked to aliphatic and/or aromatic moieties. Polyaspartic esters are particularly preferred compounds that contain two secondary amine groups.

Advantages of the presently claimed invention include the increased refractive index of the polyurethane/ureas which comprise OH-functional polybutadienes, OH-functional polyalkylene phthalates, OH-functional polyalkylene isophthalates and/or or OH-functional polyalkylene terepthalates compared to the polyurethane/polyurea materials previously known and/or described in the art, while maintaining desirable processing characteristics described in the art.

SUMMARY OF INVENTION

This invention relates to polyurethane/polyurea materials, and to a process for preparing these polyurethane/polyurea materials.

These polyurethane/polyurea materials comprise the reaction product of:
 (A) a polyisocyanate prepolymer having an NCO group content of about 4 to about 30% and an average functionality of 1.8 to 6, and which comprise the reaction product of
  (1) at least one (cyclo)aliphatic polyisocyanate having an NCO group content of about 15 to 60% by weight, and a functionality of about 1.8 to 5, and being selected from the group consisting of dicyclohexylmethane-4,4'-diisocyanate (rMDI), pentane diisocyanate, 1,6-hexamethylene diisocyanate (HDI), isophorone diisocyanate (IPDI), 1,4-cyclohexane diisocyanate (CHDI), m-tetramethylxylene diisocyanate (m-TMXDI), trimers of 1,6-hexamethylene diisocyanate (HDI), biurets of 1,6-hexamethylene diisocyanate (HDI), allophanates of 1,6-hexamethylene diisocyanate (HDI), allophanates of trimers of 1,6-hexamethylene diisocyanate (HDI) and mixtures thereof;
  with
  (2) an organic compound having from 1.8 to 5 hydroxyl groups, a hydroxyl equivalent weight of 150 to 2000, and which is selected from the group consisting of OH functional polybutadienes, OH-functional polyalkylene phthalates, OH-functional isophthalates, OH-functional terephthalates and mixtures thereof;
 and
 (B) an isocyanate-reactive component comprising at least one aromatic diamine compound which contains at least two aromatic amine groups and has a molecular weight of from 100 to 1,000;
wherein the relative quantities of (A) and (B) are such that the Isocyanate Index is from about 70 to about 130.

The process for preparing these polyurethane/polyurea materials comprises reacting
 (A) a polyisocyanate prepolymer having an NCO group content of about 4 to about 30% and an average functionality of 1.8 to 6, and which comprise the reaction product of
  (1) at least one (cyclo)aliphatic polyisocyanate having an NCO group content of about 15 to 60% by weight, and a functionality of about 1.8 to 5, and being selected from the group consisting of dicyclohexylmethane-4,4'-diisocyanate (rMDI), pentane diisocyanate, 1,6-hexamethylene diisocyanate (HDI), isophorone diisocyanate (IPDI), 1,4-cyclohexane diisocyanate (CHDI), m-tetramethylxylene diisocyanate (m-TMXDI), trimers of 1,6-hexamethylene diisocyanate (HDI), biurets of 1,6-hexamethylene diisocyanate (HDI), allophanates of 1,6-hexamethylene diisocyanate (HDI), allophanates of trimers of 1,6-hexamethylene diisocyanate (HDI) and mixtures thereof;
  with
  (2) an organic compound having from 1.8 to 5 hydroxyl groups, a hydroxyl equivalent weight of 150 to 2000, and which is selected from the group consisting of OH functional polybutadienes, OH-functional polyalkylene phthalates, OH-functional polyalkylene isophthalates, OH-functional polyalkylene terepthalates and mixtures thereof;
 and
 (B) an isocyanate-reactive component comprising at least one aromatic diamine compound which contains at least two aromatic amine groups and has a molecular weight of from 100 to 1,000;
wherein the relative quantities of (A) and (B) are such that the Isocyanate Index is from about 70 to about 130.

DETAILED DESCRIPTION OF INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Any of the upper and lower limits of ranges disclosed herein may be used in any combination, except in the operating examples or unless otherwise indicated. All ranges are inclusive of the end points unless expressly stated otherwise.

Equivalent weights and molecular weights given herein in Daltons (Da) are number average equivalent weights and number average molecular weights respectively, unless indicated otherwise.

The polyisocyanate prepolymer, component (A), has an NCO group content of about 4 to 30%, and an average functionality of 1.8 to 6. Preferably, component (A) has an NCO group content of about 7 to 25%, most preferably 10 to 20% by weight, and preferably has a functionality of 1.9 to 2.5.

More specifically, component (A) comprises the reaction product of A)(1) a (cyclo)aliphatic polyisocyanate having an NCO group content of about 15 to 60% by weight, and a functionality of about 1.8 to 5 and being selected from the group consisting of dicyclohexylmethane-4,4'-diisocyanate (rMDI), pentane diisocyanate, 1,6-hexamethylene diisocyanate (HDI), isophorone diisocyanate (IPDI), 1,4-cyclohexane diisocyanate (CHDI), m-tetramethylxylene diisocyanate (m-TMXDI), trimers of 1,6-hexamethylene diisocyanate (HDI), biurets of 1,6-hexamethylene diisocyanate (HDI), allophanates of 1,6-hexamethylene diisocyanate (HDI), allophanates of trimers of 1,6-hexamethylene diisocyanate (HDI) and mixtures thereof; with (A)(2) at least one organic compound having 1.8 to 5 hydroxyl groups and a hydroxyl equivalent weight of from 150 to 2000, and which is selected from the group consisting of OH terminated polybutadienes, OH-functional polyalkylene phthalates, OH-functional polyalkylene isophtalates, OH-functional polyalkylene terephthalates and mixtures thereof.

Suitable (cyclo)aliphatic polyisocyanates for component (A)(1) include those having an NCO group content of about 15% to about 60% by weight, preferably from about 15 to about 52% by weight and more preferably from about 28 to about 40% by weight; and which have a functionality of about 1.8 to about 5, preferably from about 2 to about 4 and more preferably from about 2 to about 3. Suitable (cyclo)aliphatic polyisocyanates are selected from the group consisting of dicyclohexylmethane-4,4'-diisocyanate (rMDI), pentane diisocyanate, 16-hexamethylene diisocyanate (HDI), isophorone diisocyanate (IPDI), 1,4-cyclohexane diisocyanate (CHDI), m-tetramethylxylene diisocyanate (m-TMXDI), trimers of 1,6-hexamethylene diisocyanate (HDI), biurets of 1,6-hexamethylene diisocyanate (HDI), allophanates of 1,6-hexamethylene diisocyanate (HDI), allophanates of hexamethylene diisocyanate (HDI) trimers and mixtures thereof.

The preferred polyisocyanate for component (A)(1) is dicyclohexylmethane-4,4'-diisocyanate, which has an isocyanate group content of about 32%. This material is commercially available from Bayer MaterialScience as Desmodur W.

Component (A)(2), the organic compound has 1.8 to 5 and preferably 1.9 to 2.5 hydroxyl groups and a hydroxyl equivalent weight of from 150 to 2000 and preferably from 150 to 500. Suitable organic compounds to be used as component (A)(2) in accordance with the present invention include, for example, OH-functional polybutadienes, OH-functional polyalkylene phthalates, OH-functional polyalkylene isophtalates, OH-functional polyalkylene terephthalates and mixtures thereof.

Examples of suitable OH functional organic compounds which satisfy the above disclosed functionality and hydroxyl equivalent weights for component (A)(2) include OH-functional polyalkylene phthalates, OH-functional polyalkylene isopthalates, OH-functional polyalkylene terephthalates and OH functional polybutadienes where the polybutadiene backbone comprises 1,4- and/or 1,2-addition products of butadiene and the terminal OH groups are primary allylic hydroxyl groups (such as the OH functional Poly Bd® products available from Cray Valley), polyesters where the polyalkylene component is ethylene glycol or diethylene glycol and the diacid unit is based on phthalic acid, isophthalic acid or terephthalic acid such as those available from Stepan chemical under the Stepanpol® trade name. Mixtures of these compounds are also suitable for the present invention.

The polyisocyanate prepolymer component (A) can be formed, for example, by reacting (1) the diisocyanate and (2) the organic compound under a nitrogen blanket or sparge, optionally, in the presence of a catalyst, and heating to about 60-120° C. for between 4 and 12 hours. The reaction is monitored by % NCO titration. Other suitable processes for the preparation of prepolymers, which are known, can also be used. The prepolymer can optionally contain catalysts to accelerate the hydroxyl-isocyanate group reaction, which are known to those skilled in the art.

Component (B), the isocyanate-reactive component, comprises at least one organic compound which contains at least two aromatic amine groups and has a molecular weight of from 100 to 1,000. A preferred embodiment of the organic compound containing at least two aromatic amine groups has a molecular weight of about 108 to about 500. It is more preferred that from two to three aromatic amine groups be present in the organic compound (B). Most preferred as component (B) are those organic compounds having an aromatic amine functionality of about 2 and a molecular weight of about 150 to about 250. The aromatic diamines can contain ether groups and/or ester groups but are preferably free of such groups. Amine-terminated polyethers with the amine-terminating groups as aromatic amine groups are also suitable for use as component (B).

Suitable examples of organic compounds containing at least two aromatic amine groups to be used as component (B) include aromatic diamine chain extenders having a molecular weight of from 100 to 1,000. The preferred amine chain extenders contain exclusively aromatically bound primary or secondary (preferably primary) amino groups, and preferably also contain substituents. Examples of such diamines include 1,4-diaminobenzene; 2,4- and/or 2,6-diaminotoluene; 2,4'- and/or 4,4'-diaminodiphenylmethane; 3,3'-dimethyl-4,4'-diaminodiphenylmethane; 3,3'-dichloro-4,4'-diaminodiphenylmethane (MOCA); 3,5-dimethylthiotoluene-2,4- and/or -2,6-diamine; 1,3,5-triethyl-2,4-diaminobenzene; 1,3,5-triisopropyl-2,4-diaminobenzene; 1-methyl-3,5-diethyl-2,4- and/or -2,6-diaminobenzene (also known as 3,5-diethyltoluene-2,4- and/or -2,6-diamine, or DETDA); 4,6-dimethyl-2-ethyl-1,3-diaminobenzene; 3,5,3',5'-tetraethyl-4,4-diaminodiphenylmethane; 3,5,3',5'-tetraisopropyl-4,4'-diaminodiphenylmethane; 3,5-diethyl-3',5'-diisopropyl-4,4'-diaminodiphenylmethane; 2,4,6-triethyl-m-phenylenediamine (TEMPDA); 3,5-diisopropyl-2,4-diaminotoluene; 3,5-di-sec-butyl-2,6-diaminotoluene; 3-ethyl-5-isopropyl-2,4-diaminotoluene; 4,6-diisopropyl-m-phenylenediamine; 4,6-di-tert-butyl-m-phenylenediamine; 4,6-diethyl-m-phenylenediamine; 3-isopropyl-2,6-diaminotoluene; 5-isopropyl-2,4-diaminotoluene; 4-isopropyl-6-methyl-m-phenylenediamine; 4-isopropyl-6-tert-butyl-m-phenylenediamine; 4-ethyl-6-isopropyl-m-phenylenediamine; 4-methyl-6-tert-butyl-m-phenylenediamine; 4,6-di-sec-butyl-m-phenylenediamine; 4-ethyl-6-tertbutyl-m-phenylenediamine; 4-ethyl-6-sec-butyl-m-phenylenediamine; 4-ethyl-6-isobutyl-m-phenylenediamine; 4-isopropyl-6-isobutyl-m-phenylenediamine; 4-isopropyl-6-sec-butyl-m-phenylenediamine; 4-tert-butyl- 6-isobutyl-m-phenylenediamine; 4-cyclopentyl-6-ethyl-m-phenylenediamine; 4-cyclohexyl-6-isopropyl-m-phenylenediamine; 4,6-dicyclopentyl-m-phenylenediamine; 2,2',6,6'-tetraethyl-4,4'-methylenebisaniline; 2,2',6,6'-tetraisopropyl-4,4'-methylenebisaniline(methylenebis diisopropylaniline); 2,2',6,6'-tetra-sec-butyl-4,4'-methylenebisaniline; 2,2'-dimethyl-6,6'-di-tert-butyl-4,4'-methylenebisaniline; 2,2'-di-tert-butyl-4,4'-methylenebisaniline; and 2-isopropyl-2',6'-diethyl-4,4'-methylenebisaniline. Such diamines may, of course, also be used as mixtures.

In a preferred embodiment, component (B), the organic compound containing at least two aromatic amine groups, comprises a compound which is selected from the group consisting of 3,5-dimethylthiotoluene-2,4-diamine, 3,5-dimethylthiotoluene-2,6-diamine, 3,5-diethyltoluene-2,4-diamine, 3,5-diethyltoluene-2,6-diamine and mixtures thereof.

In a more preferred embodiment, component (B) comprises at least one aromatic diamine compound which contains from 1 to 8 thiomethyl groups, and has a molecular weight of from 150 to 1000. Most preferred compounds for component (B) contain from 1 to 3 thiomethyl groups, and have a molecular weight of from 150 to 300.

Examples of these more preferred aromatic diamine compounds containing 1 to 8 thiomethyl groups include 3,5-dimethylthiotoluene-2,4-diamine, 3,5-dimethylthiotoluene-2,6-diamine, isomers of di(methylthio)benzene diamine and di(methylthio)toluene diamine, isomers of tri(methylthio)benzene diamine and tri(methylthio)toluene diamine and all isomers of thiomethyl group substituted benzene diamines thiomethyl group substituted toluene diamines, thiomethyl group substituted diphenylmethane diamines and mixtures thereof. Most preferred compounds to be used as component (B) are 3,5-dimethylthiotoluene-2,4-diamine, 3,5-dimethylthiotoluene-2,6-diamine and mixtures thereof.

In addition, various additives may also be present in the reaction, for example, surface-active additives such as emulsifiers, and other additives known to be useful in polyurethane chemistry.

In addition to the surface-active agents, other additives which may be used in the molding compositions of the present invention include flame retarding agents, plasticizers, antioxidants, UV stabilizers, adhesion promoters, dyes, viscosity depressants, and internal mold release agents. Suitable antioxidants include, for example, Irganox 245, and suitable UV stabilizers include, for example, Tinuvin 765. However, any of the known antioxidants and/or UV stabilizers may be used.

External release agents, such as silicone oils, are often used during the molding process. It is, however, also possible to use so-called "internal release agents", optionally in admixture with external release agents. The reactants are used in quantities such that the isocyanate index is from about 70 to 130, preferably from about 90 to about 110. By "isocyanate index" is meant the quotient of the number of isocyanate groups divided by the number of isocyanate-reactive groups, multiplied by 100.

The polyurethane/polyurea materials of the invention are preferably prepared by casting into a suitable mold. The temperature at which the polyurethane/polyurea materials of the invention are prepared is generally not critical and the mold temperature can be at ambient temperatures. Ambient temperature is defined for the purposes of the present invention as temperature from about 20 to about 25° C. The processing temperatures are usually less than 70° C. The gel time for the one-shot process of the present invention is preferably greater than 2 minutes. The polyurethane/polyurea materials of the present invention have a shore hardness that can vary over a very wide range, i.e., Shore A 40-Shore D 95, depending on the choice of polyisocyanate prepolymer, and aromatic diamine compounds. Polyurethane/polyurea materials of high hardness, i.e. greater than Shore D 50, are preferably post cured at temperatures above 100° C. for about 16 hours.

As used herein, the term "optically clear" means a light transmittance similar or superior to other polymer glasses, i.e. acrylics or polycarbonates. The light transmittance of the polyurethane/polyurea or polyurea materials of the present invention is close to optical grade glass used for lenses, binoculars, etc.

The polyurethane/ureas of the present invention have a higher refractive index than commercially available polyurethane materials such as Trivex®. According to public information on lenses for eyeglasses, Trivex® has a refractive index of 1.53 and an Abbe number of 45. See the information found in the article titled "Polycarbonate vs. Trivex Eyeglass Lenses—Which is Right for You?" by Gary Heiting, OD, which is available at the website: www.allaboutvision.com. Also see the article "Trivex Material—Unique Attributes Make It More Than A Niche Material" by Mark Mattison-Shupnick, ABOM, released August 2010, which is available at the website: www.2020mag.com.

The light-stable polyurethane/polyurea described herein may be used as a glass substitute, for example as sun roofs, front windows, back windows or side windows in automotive or aircraft construction and/or as lamp covers, for example as front lamps or rear lamps in aircraft or automotive construction. The polyurethane/polyurea materials according to the invention may preferably be used, for example, in optical applications such as lenses for eyeglasses, safety glasses, and security glass.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively. All molecular weights are number average molecular weights expressed in units of g/mole.

EXAMPLES

The following components were used in the working examples:
 Iso A: dicyclohexylmethane-4,4'-diisocyanate which contains about 20% of the trans, trans isomer, and has an NCO group content of about 32%
 Polyol A: an OH functional polypropylene glycol based polyether polyol having a molecular weight of about 425 and an hydroxyl functionality of about 2
 Polyol B: an OH functional polycaprolactone polyester having a MW of about 400 and an hydroxyl functionality of about 2; described as a polymer of 2-oxepanone with 1,6-hexanediol; commercially available as Tone® UC 32B8 from Dow Chemical (CAS RN=36609-29-7)
 Polyol C: an OH functional polybutadiene having a molecular weight of 2100 and an hydroxyl functionality of about 1.9; commercially available as Krasol® LBH-2000 from Cray Valley
 Polyol D: an OH functional polybutadiene having a molecular weight of about 2800 and an hydroxyl functionality of about 2.5; commercially available as Poly Bd® R 45HTLO from Cray Valley Polyol E: a diethylene glycol/phthalic anhydride based aromatic polyester polyol having a 560 molecular weight; commercially available as Stepanpol® PD-200LV Polyol F: a diethylene glycol/phthalic anhydride based aromatic polyester polyol having a 580 molecular weight; commercially available as Stepanpol® PS-20-200A Polyol G: an OH functional polybutadiene having a molecular weight of about 1100 and an hydroxyl functionality of about 2.5; commercially available as Poly Bd® R 20LM from Cray Valley Diamine A: a mixture of 80% by weight of 3,5-dimethylthiotoluene-2,4-diamine and 20% by weight of 3,5-dimethylthiotoluene-2,6-diamine; commercially available as Ethacure® 300 Curative from the Albemarle Corporation.

Diamine B: a mixture of 80% by weight of 3,5-diethyltoluene-2,4-diamine and 20% by weight of 3,5-diethyltoluene-2,6-diamine; commercially available as Ethacure® 100LC Curative from the Albemarle Corporation.

Catalyst A: dibutyltin dilaurate commercially available from Air Products as Dabco® T12

Prepolymers 1-7 were prepared using the following general procedure: The isocyanate component was charged to a glass, 3-neck, round bottom reactor with mechanical stirring, temperature control and a nitrogen gas inlet. Stirring was started and 50 ppm of Catalyst A was added. This mixture was heated under a nitrogen atmosphere to 70° C. and the polyol was added in the amount set forth in TABLE 1 to form a prepolymer with the % NCO shown in TABLE 1. The exotherm was controlled with a warm water bath, until the temperature stabilized at 70° C., The mixture was allowed to react until complete (i.e. 3 to 4 hours), as evidenced by reaching the theoretical isocyanate content. The isocyanate content was determined by withdrawing samples and titrating for weight % NCO content using dibutyl amine as is well known to one skilled in the art. Once the sample had reached the theoretical NCO content, the finished prepolymer was packaged, padded with nitrogen and held for preparation of the final part to be prepared in a casting step. Details on the formulations for Prepolymers 1-7 are set forth in TABLE 1 below.

TABLE 1

Prepolymers 1-7

| Prepolymer | Iso A (g) | Polyol (g) | % NCO | Viscosity (° C.) |
|---|---|---|---|---|
| Comparative Prepolymer 1 | 266.3 | Polyol A (160.7) | 12.4% | 33422 (25° C.) |
| Comparative Prepolymer 2 | 187.3 | Polyol B (112.2) | 12.2% | 977 (73° C.) |
| Prepolymer 3 | 148.5 | Polyol C (101.5) | 17.4% | 954 (25° C.) |
| Prepolymer 4 | 148.3 | Polyol D (101.7) | 17.4% | 2281 (25° C.) |
| Prepolymer 5 | 149.9 | Polyol G (99.4) | 16.0% | 2998 (25° C.) |
| Prepolymer 6 | 148.5 | Polyol E (92.8) | 13.6% | 804 (73° C.) |
| Prepolymer 7 | 161.2 | Polyol F (101.3) | 13.9% | 955 (73° C.) |

Polyurethane/polyureas were prepared from the above materials in accordance with the formulations set forth in TABLE 2.

In the following examples, a polyurethane/polyurea was prepared from a prepolymer and a diamine. In all Examples, the diamine was at room temperature (i.e. ~20-25° C.) prior to being combined with the prepolymer, which was heated to 50-60° C. prior to mixing with the diamine.

In each Example, Prepolymer A was added to a Flacktek Speed Mixer™ Max 100 mixing cup. To this prepolymer, the calculated amount of amine was added at room temperature to achieve an NCO:OH equivalent ratio of 1.05 (105 index). These components were mixed at 2000 rpm for 30 seconds in a Hauschild DAC 400 FV SpeedMixed™. The mixture was then cast into a ⅛ inch thick test parts for refractive index measurements. The test parts were allowed to cure at 110° C. for 18 hours prior to testing.

The refractive index and the ABBE number were determined in accordance with ASTM D542 (Index of Refraction of Transparent Organic Plastics). Refractive index was characterized using a Bausch and Lomb ABBE 3 L refractometer at room temperature with a Na vapor bulb (589.3 nm).

Formulation details for polyurethane/ureas are set forth in TABLE 2 below.

TABLE 2

| Example | Prepolymer | Mass of Prepolymer (g) | Diamine | Mass of diamine (g) |
|---|---|---|---|---|
| 1 (Comparative) | Prepolymer 1 | 100 | A | 30.0 |
| 2 (Comparative) | Prepolymer 2 | 100 | A | 29.5 |
| 3 | Prepolymer 3 | 100 | A | 42.1 |
| 4 | Prepolymer 4 | 100 | A | 42.1 |
| 5 | Prepolymer 5 | 50 | A | 19.4 |
| 6 (Comparative) | Prepolymer 1 | 100 | B | 25.2 |
| 7 (Comparative) | Prepolymer 2 | 100 | B | 24.7 |
| 8 | Prepolymer 3 | 100 | B | 35.3 |
| 9 | Prepolymer 4 | 100 | B | 35.3 |
| 10 | Prepolymer 5 | 50 | B | 16.2 |
| 11 | Prepolymer 6 | 50 | A | 16.5 |
| 12 | Prepolymer 7 | 10 | A | 3.36 |
| 13 | Prepolymer 6 | 50 | B | 13.7 |
| 14 | Prepolymer 7 | 10 | B | 2.82 |

TABLE 3 below shows the Refractive Index, Abbe Number and appearance of each polyurethane/polyurea formed in TABLE 2.

TABLE 3

| Example | Refractive Index | Abbe Number | Appearance |
|---|---|---|---|
| Comparative Example 1 | 1.544 | 37 | clear |
| Comparative Example 2 | 1.553 | 41 | clear |
| 3 | 1.565 | 35 | opaque |
| 4 | 1.569 | 33 | opaque |
| 5 | 1.569 | 35 | clear |
| Comparative Example 6 | 1.521 | 44 | clear |
| Comparative Example 7 | 1.528 | 49 | clear |
| 8 | 1.538 | 44 | hazy |
| 9 | 1.542 | 41 | hazy |
| 10 | 1.543 | 41 | clear |
| 11 | 1.565 | 44 | clear |
| 12 | 1.574 | 35 | clear |
| 13 | 1.544 | 49 | clear |
| 14 | 1.554 | 42 | clear |

Due to the effect of the diamine component on the Refractive Index, in order to isolate the impact of the polyol component in the isocyanate component, only Examples 1-5 and 11-12 should be directly compared to one another. Examples 3-5 and 11-12 are illustrative of the present invention, while Examples 1-2 are outside the scope of the present invention. For similar reasons, Examples 6-10 and 13-14 can be directly compared to one another. Examples 8-10 and 13-14 are illustrative of the present invention, while Examples 6 and 7 are outside the scope of the present invention.

A comparison of Examples 3-5 and 11-12 which contain a polyol required by the present invention with Examples 1 and 2 makes it evident that the examples of the invention exhibit a higher refractive index than the comparative examples (Examples 1 and 2).

A review of Examples 6-10 and 1314 reveals that the examples which contain a polyol required by the present invention (8, 9, 10, 13 and 14) exhibit a higher refractive index than the comparative examples (Examples 6 and 7).

It is also evident from these examples that the present invention increases the refractive index without a significant detrimental effect (i.e. decrease) in Abbe number.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane/polyurea material comprising the reaction product of:
    (A) a polyisocyanate prepolymer having an NCO group content of about 4 to 30%, and an average functionality of 1.8 to 6 which consists of the reaction product of
        (1) dicyclohexylmethane-4,4'-diisocyanate having an NCO group content of about 15% to 60% by weight, and a functionality of about 1.8 to 5;
        with
        (2) an organic compound consisting of an OH-functional polybutadiene having from 1.8 to 5 hydroxyl groups and an hydroxyl equivalent weight of from 150 to 500 g/eq.;
    with
    (B) an isocyanate-reactive component consisting of 3,5-dimethylthiotoluene-2,4-diamine, 3,5-dimethylthiotoluene-2,6-diamine, 3,5-diethyltoluene-2,4-diamine, 3,5-diethyltoluene-2,6-diamine, or mixtures thereof, in the absence of other isocyanate-reactive components;
    wherein the relative quantities of (A) and (B) are such that the Isocyanate Index is from about 70 to about 130, and the resultant polyurethane/urea is optically clear.

2. A process for preparing a polyurethane/polyurea material comprising reacting:
    (A) a polyisocyanate prepolymer having an NCO group content of about 4 to 30%, and an average functionality of 1.8 to 6 which consists of the reaction product of
        (1) dicyclohexylmethane-4,4-diisocyanate having an NCO group content of about 15 to 60% by weight, and a functionality of about 1.8 to 5;
        with
        (2) an organic compound consisting of an OH-functional polybutadiene having from 1.8 to 5 hydroxyl groups, and a hydroxyl equivalent weight of from 150 to 500 g/eg;
    with
    (B) an isocyanate-reactive component consisting of 3,5-dimethylthiotoluene-2,4-diamine, 3,5-dimethylthiotoluene-2,6-diamine, 3,5-diethyltoluene-2,4-diamine, 3,5-diethyltoluene-2,6-diamine, or mixtures thereof, in the absence of other isocyanate-reactive components;
    wherein the relative quantities of (A) and (B) are such that the Isocyanate Index is from about 70 to about 130, and the resultant polyurethane/urea is optically clear.

3. The polyurethane/polyurea material of claim 1, wherein the relative quantities of (A) and (B) are such that the Isocyanate Index is from about 90 to about 110.

4. The process of claim 2, wherein the relative quantities of (A) and (B) are such that the Isocyanate Index is from about 90 to about 110.

* * * * *